INVENTOR.
Richard H. Adlhoch
BY
Harness, Dickey & Pierce
ATTORNEYS

United States Patent Office 3,538,444
Patented Nov. 3, 1970

3,538,444
ANALOG TO DIGITAL SIGNAL CONVERTING SYSTEM HAVING A HYSTERESIS CREATING FEEDBACK LOOP
Richard H. Adlhoch, Jackson, Mich., assignor to Mechanical Products, Inc., Jackson, Mich., a corporation of Delaware
Filed May 4, 1967, Ser. No. 636,178
Int. Cl. G06g 7/14; H03b 3/02; H05k 5/20
U.S. Cl. 328—146    1 Claim

ABSTRACT OF THE DISCLOSURE

A condition sensing network which includes a sensing device developing a differential voltage in accordance with a particular condition to be sensed, this differential voltage being impressed on a differential amplifier type of circuit to produce an output which varies in magnitude in accordance with the differential voltage. The output of the differential amplifier is sensed by a detector circuit and the detector circuit impresses the sensed signal on a voltage responsive circuit, as for example a Schmitt trigger, which changes its conductive state when a particular threshold voltage is reached.

The circuit further includes a feedback loop to vary the effect of the differential voltage on the differential amplifier. The feedback loop is connected to the input section of the differential amplifier such that, once the threshold voltage has been reached and the state of the Schmitt trigger is switched, the feedback signal changes the bias of the differential amplifier to further increase the effect of the differential voltage being fed to the differential amplifier from the sensor. In this way the effect of the difference signal being fed from the sensor to the differential amplifier is increased by an amount which varies in accordance with the condition of the feedback loop and the circuit parameters thereof.

---

This invention relates to a circuit protection and/or status indication network and specifically to a means for sensing a particular condition in a system, a condition which is either above or below limits, and providing an output signal when a certain limit is reached, provision being made for resetting the indicating network when a second limit is reached or exceeded thereby providing a differential operation of the system.

Automatic resetting circuit protection and indicating networks have been utilized in the past with success. However, a need has arisen for a circuit of the automatic resetting type which includes a differential spread in its operation wherein the circuit is tripped at a preselected value, when the sensed condition is either under or over a selected value of, for example, voltage, current, etc., wherein the circuit will reset at a different preselected value. The system of the present invention, as illustrated in the preferred embodiment of FIG. 1, provides a differential operation of the output circuit wherein the circuit trips at a first preselected threshold condition to provide an on signal, and the circuit resets at a preselected second threshold condition to reset the indicator circuit to the off condition.

Accordingly it is one object of the present invention to provide an improved circuit protection and/or indicating network which provides a differential operation of the output circuit.

It is another object of the present invention to provide an improved circuit protection and/or indication network which is threshold sensitive wherein the operator may vary the resetting threshold of the system.

It is still another object of the present invention to provide a network of the type described wherein a feedback loop is provided to increase the effect of the sensed condition such that a differential operation of the output circuit is provided.

Further objects, features and advantages of this invention will become apparent from a consideration of the following description, the appended claim and the accompanying drawing in which:

Figure 1:
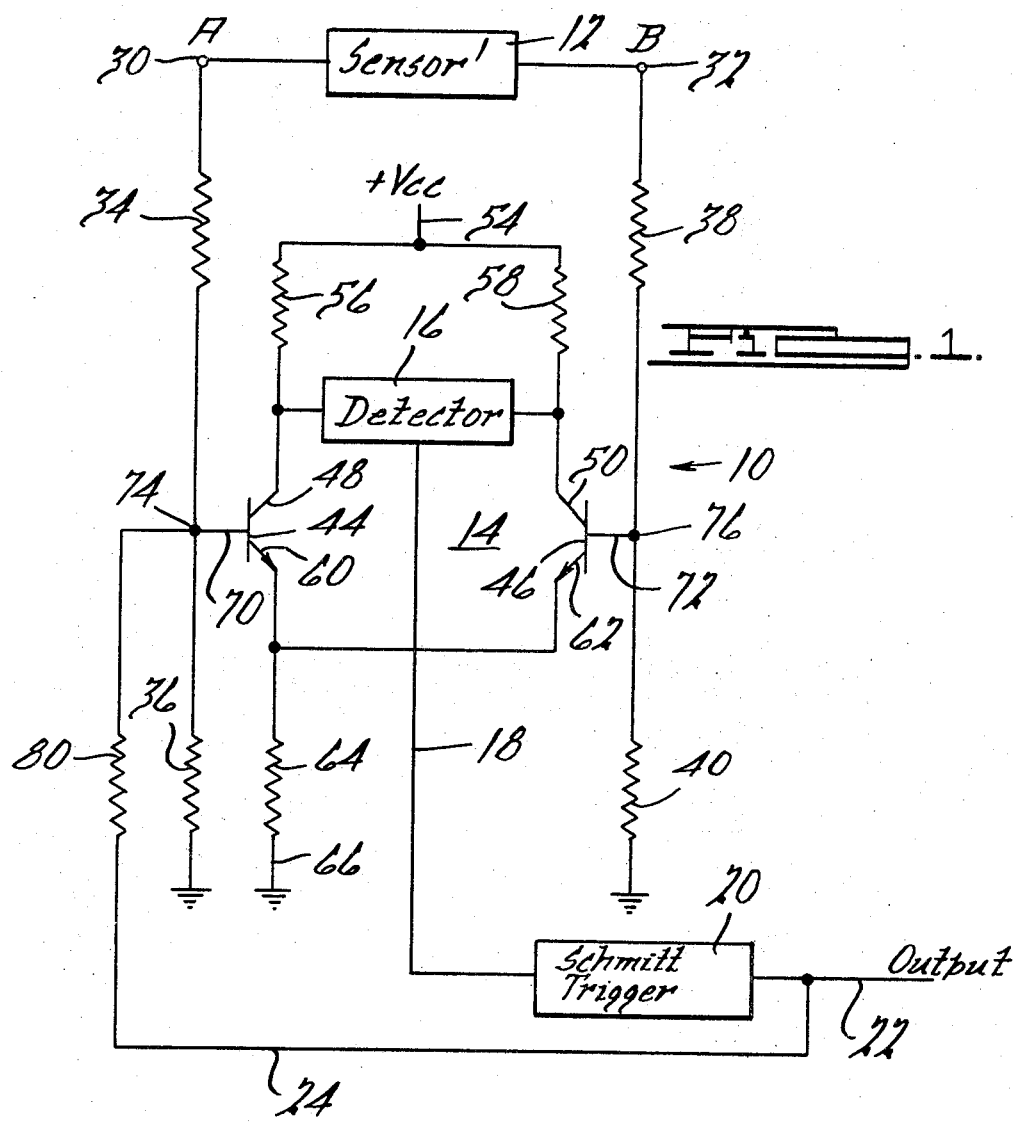
FIG. 1 is a schematic circuit diagram of a preferred embodiment of a circuit protection and/or indicating system incorporating certain features of the present invention.

Referring now to FIG. 1 there is illustrated a circuit protection and/or indicating system 10 which includes a sensor 12 connected to sense a particular condition which is desired to be indicated, the output of the sensor being fed to a differential amplifier circuit 14 to vary the conductive state of the two components of the differential amplifier 14. The operation of the differential amplifier 14 is sensed by a detector circuit 16 to provide an output signal on an output conductor 18, the voltage level of which varies in accordance with the sensed conductive condition of the differential amplifier.

This output signal on conductor 18 is fed to a theshold voltage responsive circuit 20, as for example a Schmitt trigger, to provide an output signal on output conductor 22 in accordance with the magnitude of the signal on conductor 18. The output of the Schmitt trigger 20 is also fed back by means of a feedback loop conductor 24 and resistor 80 to one of the input terminals of the differential amplifier circuit 14 to increase the differential operation of the amplifier circuit 14 thereby providing a differential spread in the resetting of the system 10. With the signal being fed to the amplifier circuit 14, the sensor differential signal as provided by sensor 12, must drop to a preselected second threshold voltage, as for example a voltage $V_2$, before the circuit is reset to the original state.

Figure 2:
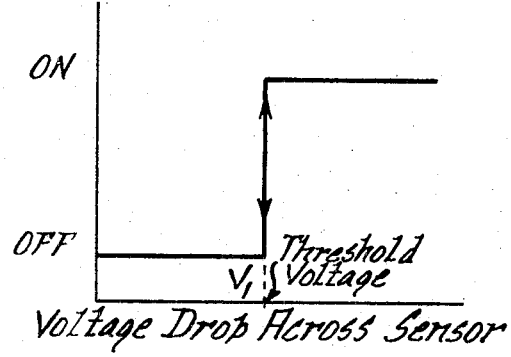
FIG. 2 is a graph illustrating the sensed voltage as compared to the operation of the output circuit in certain prior are systems.
Figure 3:
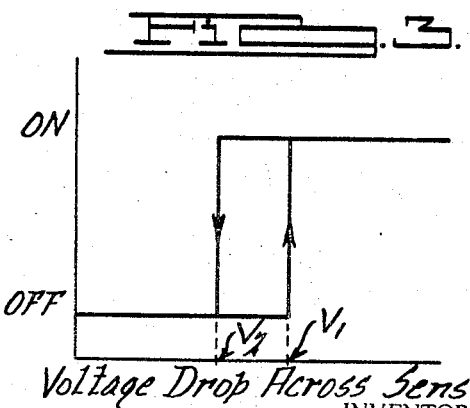
FIG. 3 is a graph illustrating the sensed voltage as compared to the output circuit operation of the present invention illustrating the differential operation of the output circuit.

This operation is depicted particularly in FIGS. 2 and 3 which graphically illustrate the operation of the output circuit as compared to the sensed voltage drop across the sensor. Referring particularly to FIG. 2 it is seen that the voltage drop across the sensor proceeds from zero to a preselected voltage $V_1$, during which time the output circuit, as represented by the Schmitt trigger 20, is in the off condition. When the threshold voltage $V_1$ is reached, the Schmitt trigger changes from a first state to a second state to indicate an on condition of the indicating circuit.

As long as the voltage drop across the sensor exceeds the voltage $V_1$, the Schmitt trigger will remain in the second state to provide an output conductor 22. However, since the Schmitt trigger is a voltage responsive device, when the voltage drop across the sensor 12 drops below the threshold voltage $V_1$, the Schmitt trigger is reset to the first state to eliminate the output indication of output conductor 22. This above description would be the operation of the output circuit without the feedback loop 24 being fed to the input of differential amplifier 14. It is to be understood that the polarity of the system could be reversed to sense a negative going voltage.

FIG. 3 illustrates the differential operation of the circuit described in conjunction with FIG. 1 with the feedback loop 24. In FIG. 3 the voltage drop across the sensor increases to a first selected threshold voltage labeled $V_1$. At this time, the Schmitt trigger threshold voltage has been reached and the Schmitt trigger switches from the first state to a second state to provide an indication signal at the output circuit 22. However, this output signal is also fed back to the input circuit of the differential amplifier 14 to further increase the effect of the differential spread of the voltage across the sensor such that the voltage across the sensor must drop to a second preselected threshold voltage $V_2$ before the circuit is reset.

With the resetting of the Schmitt trigger 20 to the original state, the feedback signal on feedback loop conductor 24 is removed so that the voltage across sensor 12 must again rise to threshold voltage $V_1$ before the Schmitt trigger is again set to the second state.

Referring back to FIG. 1 and particularly to the details thereof, it is seen that the sensor 12 is interconnected between a point 30, labeled A, and a point 32, labeled B, which may correspond to points in a circuit, the conditions of which are to be sensed. It is to be understood that the sensor 12 may be any type of device which produces a voltage varying output, as for example a resistor connected in the output line to sense load current, a piezoelectric device which is provided to sense the pressure of a particular apparatus, a thermistor carrying a constant current which is placed in thermal relation to an environment in which the temperature is desired to be sensed or the sensor 12 may be any other device which produces an output voltage which varies in accordance with the sensed condition.

The voltage at point A is fed to a voltage divider circuit which includes a pair of resistors 34, 36 which are representatively illustrated as being connected to ground, and the voltage at point B is similarly impressed on a a voltage divider network including a second pair of resistors 38, 40 also connected to ground. The differential amplifier circuit includes a pair of transistors 44 and 46 having collector electrodes 48, 50 which are connected to a positive source of DC potential at 54 through current limiting collector resistors 56, 58. The transistors further include emitter electrodes 60 and 62 which are connected to a common resistor 64, the other end of which is connected to ground at 66. The conduction of the transistors 44 and 46 are controlled by signals fed to base electrodes 70, 72 which are connected to input nodes 74, 76 forming the midpoint connections between pairs of resistors 34 and 36, and 38 and 40, respectively.

The degree of conduction of transistors 44 and 46 or the differential conduction of these transistors is sensed by the detector circuit 16 connected to collector electrodes 48 and 50, respectively, as is common in the differential amplifier art. Accordingly the detector 16 will provide a varying voltage on output conductor 18, the magnitude of which will vary in accordance with the differential collector voltages of transistors 44 and 46, respectively. This varying voltage is fed to the Schmitt trigger 20, a highly sensitive threshold voltage device, wherein the Schmitt trigger is in a first state if the threshold voltage is below a particular value, and is in a second state if the detector voltage is above that particular value. Accordingly a digital output will be provided on output conductor 22, the states of the digital voltage being directly related to the voltage on conductor 18 being above or below the threshold voltage of the Schmitt trigger 20.

As stated above, the output signal on output conductor 22 is fed back to the input circuit of the differential amplifier 14 by means of conductor 24 and, more particularly, is fed to the base electrode 70 of transistor 44 by means of a current limiting resistor 80. The signal at node 74, due to the feedback conductor 24, causes the transistor 44 to conduct more or less to increase the differential operation of the transistors 44 and 46 depending on the manner in which the transistors 44 and 46 are operated.

In describing operation of the circuit it is assumed that the detector and Schmitt trigger are connected such that a positive going signal at point B with respect to point A will cause a negative going output at the output terminal 22 from the Schmitt trigger 20. Accordingly the voltage at point A will cause a predetermined conduction of transistor 44 and the increase in voltage at point B due to the increasing of the sensed condition will cause the transistor 46 to conduct more and more. At a preselected difference in conduction of transistors 44 and 46, the voltage on conductor 18 will reach the threshold voltage of the Schmitt trigger 20 to cause the Schmitt trigger to change its original state and provide a negative signal at the output terminal 22.

The negative signal is immediately fed back by means of conductor 24 and resistor 80 to the base electrode 70 of transistor 44 to further decrease the conduction of transistor 44 and increase the difference in conduction between transistors 44 and 46. Accordingly, as the voltage drop across the sensor 12 is decreased, making the voltage at B negative going with respect to the voltage at A, the detector output will be insufficient to provide a threshold signal to the Schmitt trigger 20 to change back to its original state until the voltage drop across the sensor has decreased sufficiently to overcome the additional signal being impressed on the base electrode 70 of the transistor 44 by the Schmitt trigger.

The signal being fed to the base electrode 70 may be varied by providing a variable resistor in lieu of the resistor 80, thereby enabling the user to vary the differential operation of the system. It is to be understood that the operation of the circuit may be reversed by merely reversing the polarity of the detector or reversing the polarity of the differential amplifier 14 thereby providing the inverse input/output characteristics described above. Also, the detector may be connected between a fixed reference voltage and the collector electrode 48 or 50 of either transistor depending on the desired output characteristics.

It is to be understood that the Schmitt trigger 20 may be replaced by any other voltage responsive device, as for example a Zenner diode type circuit, if the attendant circuitry is modified to accommodate such other devices. Further, the Schmitt trigger 20 may be replaced by other devices which inherently have the differential operating characteristics described in conjunction with the feedback loop 24, as for example certain breakdown devices which require a first preselected threshold voltage to initially break down the device and the device is maintained in the breakdown condition until such time as a lower threshold voltage is achieved. However, this latter type of circuitry would require additional modification in order to make the operation of the systems selectively variable.

While it will be apparent that the embodiments of the invention herein disclosed are well calculated to fulfill the objects of the invention, it will be appreciated that the invention is susceptible to modification, variation and change without departing from the proper scope or fair meaning of the subjoined claim.

I claim:

1. A system for generating a digital output signal in response to an analogue input signal comprising differential circuit means for generating an intermediate analogue signal in response to the difference between a preselected signal level and said input signal including a differential amplifier network having a first and second amplifier, at least one of said first and second amplifiers being connected to be responsive to said input signal and a detector circuit connected to said differential circuit for generating the said intermediate signal, which signal varies in amplitude in response to variations in difference in conduction of said first and second amplifiers, Schmitt trigger threshold responsive circuit having a first and second state and connected to said detector circuit, said threshold responsive means including a voltage level responsive means having a fixed response point and switching from said first to said second states in response to said intermediate signal varying in level beyond a first preselected level and generating the output signal when said input signal causes said intermediate signal to exceed said first preselected level, said first preselected level being said fixed response point, and means outside of said Schmitt trigger circuit for varying the effect of said input signal on said differential circuit means and the threshold value of said input signal at which said threshold ressponsive means switches from said second to said first state including a feedback loop connected between the output circuit of said threshold means and the input circuit to said first amplifier to vary the difference in conduction between said first and second amplifiers and varying the effective response point of said threshold circuit to a second response point at which said shreshold circuit switches from said second to said first state, said variation in response point occurring in response to switching from said first to second state.

References Cited
UNITED STATES PATENTS

| | | | |
|---|---|---|---|
| 3,155,840 | 11/1964 | Hoeschele | 328—146 X |
| 3,239,694 | 3/1966 | Rovell | 328—147 X |
| 3,018,386 | 1/1962 | Chase | 307—290 X |
| 3,166,678 | 1/1965 | Fleshman | 307—235 |
| 3,151,256 | 9/1964 | Simon et al. | 307—235 |
| 3,281,608 | 10/1966 | Doyle | 307—235 |
| 3,316,423 | 4/1967 | Hull | 307—235 |
| 3,344,319 | 9/1967 | Schimsky | 307—290 X |
| 3,416,004 | 12/1968 | Taylor | 307—235 |

STANLEY D. MILLER, Primary Examiner

U.S. Cl. X.R.

307—235; 328—146, 149, 150; 330—30